(No Model.) 3 Sheets—Sheet 1.
H. HAMMERSCHMIDT.
DEVICE FOR MEASURING FLUIDS UNDER PRESSURE.
No. 350,826. Patented Oct. 12, 1886.
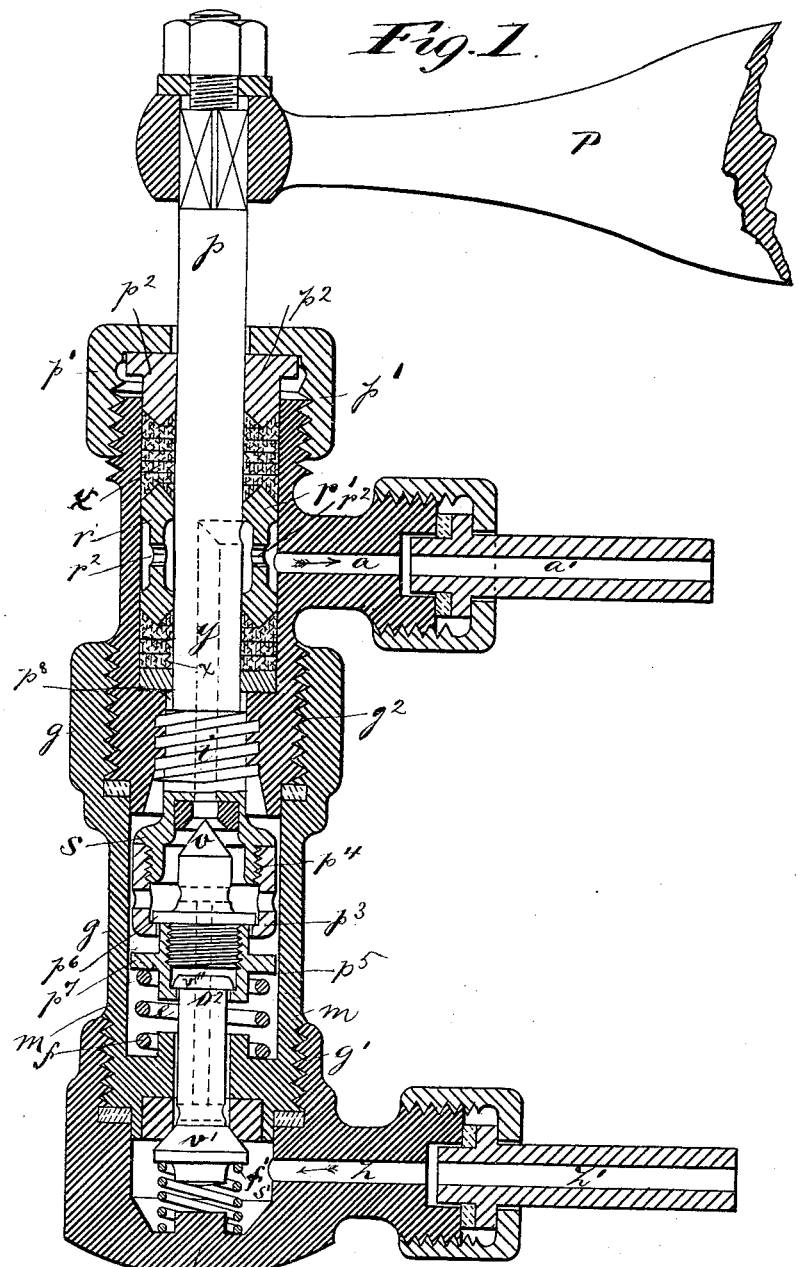
Witnesses
Gabriel J. W. Gatsley.
D. Jackson
Inventor
Hermann Hammerschmidt
By Richards
Attorneys.

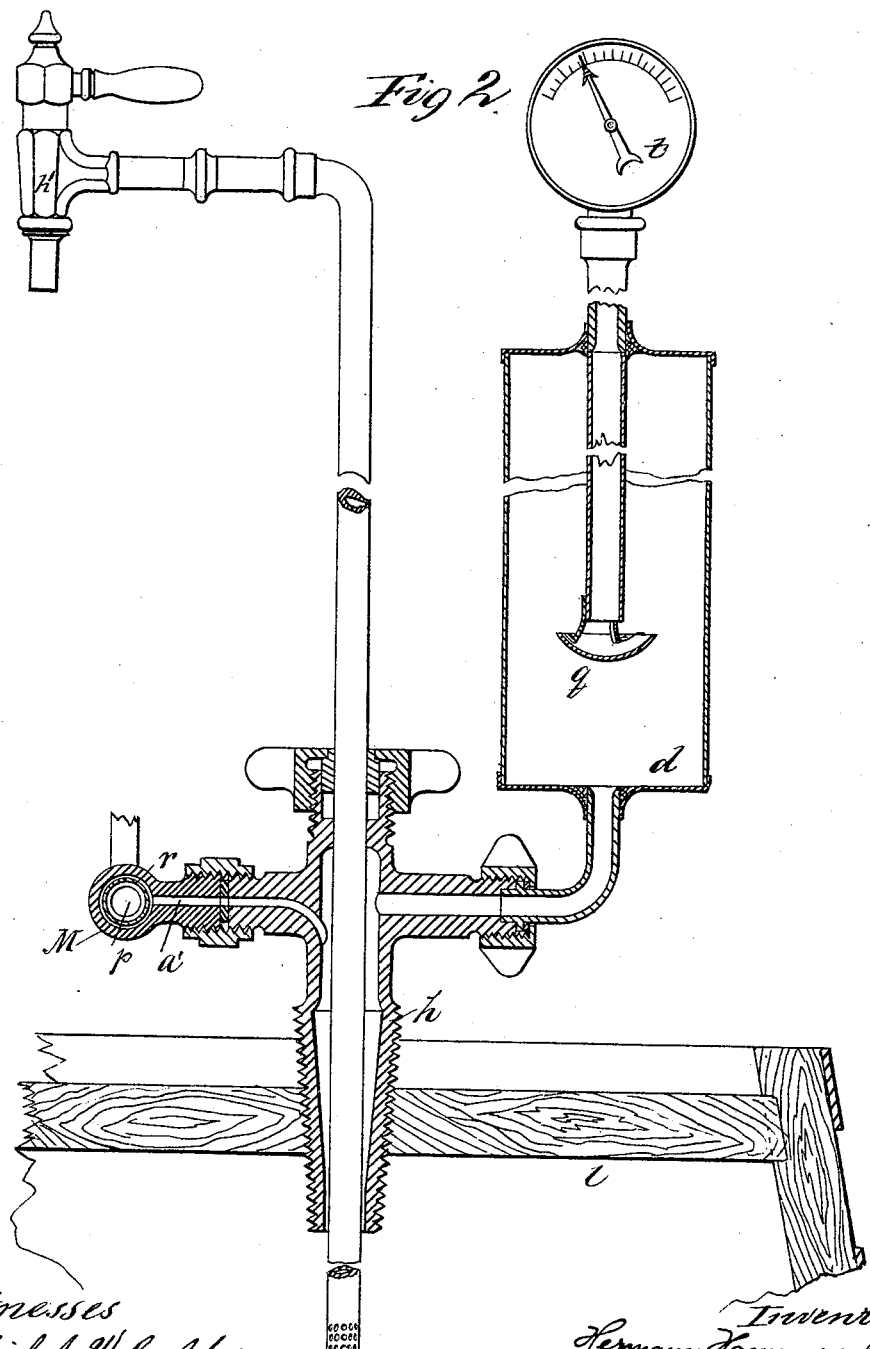

(No Model.) 3 Sheets—Sheet 3.
H. HAMMERSCHMIDT.
DEVICE FOR MEASURING FLUIDS UNDER PRESSURE.
No. 350,826. Patented Oct. 12, 1886.
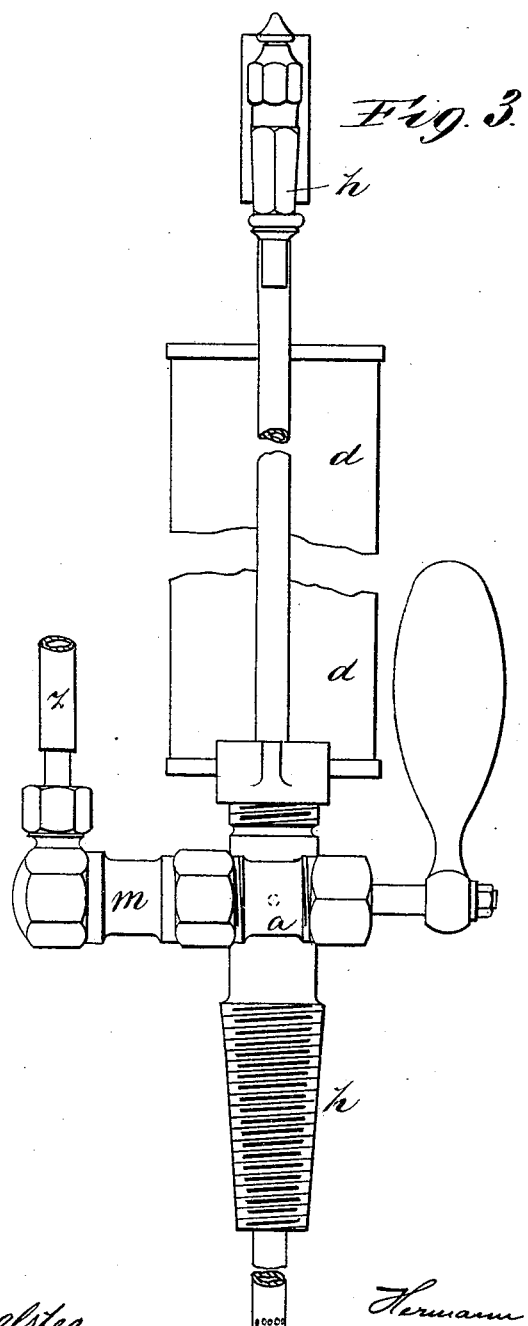

UNITED STATES PATENT OFFICE.

HERMANN HAMMERSCHMIDT, OF BARMEN-RITTERSHAUSEN, PRUSSIA, GERMANY.

DEVICE FOR MEASURING FLUIDS UNDER PRESSURE.

SPECIFICATION forming part of Letters Patent No. 350,826, dated October 12, 1886.

Application filed January 11, 1886. Serial No. 188,195. (No model.)

*To all whom it may concern:*

Be it known that I, HERMANN HAMMERSCHMIDT, of Barmen-Rittershausen, Prussia, in the German Empire, have invented a new and useful Improvement in a Measuring Device for Measuring Fluids Under Pressure; and I hereby declare the following to be a full and clear description thereof.

This invention relates to a device for measuring or separating certain fixed quantities of fluids, either gaseous or liquid, from a mass held in confinement under pressure; and it consists of certain elements or specific mechanisms for producing this result, among which are a measuring-chamber connected at one of its ends with the reservoir or tank in which the fluid to be measured is held under pressure, and at its other end with a suitable vessel, into which the measured fluid is to be discharged. The said measuring-chamber is provided at its inlet end with an inlet-valve, and at its outlet end with an outlet-valve, which are operated in part by a valve-rod from the outside of the chamber and in part by actuating-springs, and partly by pressure of the fluid under treatment acting on said valves within the measuring-chamber. These and other mechanisms belonging to the invention and the operation of the same are fully set forth and described in the subjoined specification.

The invention will be readily understood by reference to the accompanying drawings, of which Figure 1 is a sectional elevation of the said measuring-chamber and the parts thereto attached. Fig. 2 shows an attachment of this device to a beer-barrel. Fig. 3 is another view of the same device, also attached to a beer-barrel.

A cylindrical tube, $g$, is secured by screw-threads $g'$ to a coupling-piece, $k$, at its inlet end, and by the screw-threads $g^2$ to a coupling-piece, $r$, at its outlet end. The interior of the tubular piece $g$ forms the measuring-chamber $m$. At the inlet end of this chamber an elbow or coupling piece, $z$, contains a duct leading from the inlet-pipe $z'$. At the outlet end of this chamber an elbow or coupling piece contains a duct, $a$, leading into the outlet-pipe $a'$. The fluids move through these said ducts in the direction of the arrows shown in Fig. 1.

An operating-valve spindle, $p$, passes through the stuffing-box $p'$ $p^2$ into the outlet end of the coupling-piece $r$, and thence on into the contiguous end of the measuring-chamber, in which latter chamber it is attached to the operating-valves, which it moves or assists to move. A prolongation of the stuffing-box above mentioned receives the sliding collar $r'$, which concentrically surrounds the said valve-spindle at the point at which the lateral outlet-duct of $a$ leads radially therefrom. This sliding collar has both its inside and outside surfaces chambered concentrically with itself, as shown in Fig. 1, and two or more lateral ducts, $r^2$, formed through the substance of this sliding collar, connect the inner with the outer one of these chambers. A duct, $y$, leads centrally up through the valve-rod or spindle $p$ to a point about opposite the lateral outlet-duct of $a$, and thence a lateral duct, $w$, leads into the contiguous annular chamber formed between the center web of the sliding collar $r'$ and the periphery of the valve-rod, as above described. As the said valve-rod and the annular collar $r'$ are both moved up and down (relatively) more or less, and as the lateral duct $w$ is intended to connect through the lateral ducts of $r'$ with the outlet-duct through $a$, it is evident that the side annular chambers of $r'$ must be of considerable width to accommodate these different positions of these essential parts of the mechanism. The relative proportions of these parts are clearly shown in Fig. 1. The ring $r'$ is confined in the stuffing-box chamber by means of packing $x$, placed on each side of it, and it is confined in place by means of the cap-piece $p^3$ of the said stuffing-box. The valve-rod $p$ is provided with a handle or laterally-projecting operating-bar, P, at its outer end for rotating it, and with screw-threads $i$ on its periphery near its lower end, which said screw-threads engage with their corresponding screw-threads cut in the inner face of the coupling-piece $r$ at its inner end.

In operating the valve-rod $p$, so as to open or close its valves, as hereinafter described, the said valve-rod is screwed up or down by its screw-threads $i$ by the said rod being rotated, as desired, by its rotating arm or operating-bar P. The lower end of the said valve-rod $p$ is chambered out, as shown in Fig. 1, and a centrally-chambered piece, $p^3$, is screwed to it by the screw-threads $p^4$. Another chambered piece, $p^5$, is coupled to the lower end of the said chambered piece $p^3$ by the valve-piece $v$, which is screwed into $p^5$, and has a flange at its lower end, which said flange overlaps and rests upon the inwardly-projecting annular flange $p^6$, which forms the lower end of the chambered piece $p^3$. An outwardly-projecting annular flange, $p^7$, surrounds the exterior of the chambered piece $p^5$ and forms a stop to limit the upward movement of the said piece $p^5$, which is allowed to slide up into the chambered part of $p^3$, and also an abutment for the actuating spiral spring $f$ to press against. A short valve-stem, $e$, passes coaxially through the central aperture formed in the bottom end of $p^5$, and carries at its upper end a small annular collar, $v''$, which rests upon the inner face of the end of the chambered piece $p^5$, and at its lower end it carries a bevel-seated valve, $v'$. The valve-opening for this valve consists of an annular aperture concentrically surrounding the valve-rod above the said valve. This valve is seated against a soft-metal seat-piece, $s'$, and forms the inlet-valve of the measuring-chamber $m$. The outlet-valve $v$ from the said measuring-chamber is seated against a soft-metal seat-piece, $s$, which is housed or chambered into the bottom end of the valve-stem $p$. A coiled or spiral spring, $f'$, acts against the valve $v'$ to habitually press it home upon its seat $s'$. The pressure of the fluid entering through pipe $z$, below the valve $v'$, acts also to habitually close the said valve. Both the pressure of the fluid from $z$ and the spring $f'$ therefore act against the said valve $v'$ to close it, and in harmony with the spring $f$, which acts also in the same direction.

In operating this measuring device constructed as above described, starting from the closed position of the valves and with the valve-rod $p$ screwed up to the upward limit of its movement, the said valve-rod is first lowered by screwing it downward in its threads $i$ by means of its handle P. The act of screwing it down at first holds the valve $v$ tightly upon its seat $s$, and the valve $v'$ also remains seated until near the lower limit of the movement, when it is forced open, and thus allows the fluid from $z$ to enter through the aperture by the sides of the valve-stem $e$ into the measuring-chamber $m$, and when a sufficient time shall have been allowed to elapse for the filling of said chamber the valve-rod is screwed upwardly and the valve $v'$ is at the commencement of this retrograde movement closed almost instantly, so as to prevent a further inflow from $z$ into $m$, and then thereafter the valve $v$, by the continued movement of the stem $p$ becomes opened, and the measured fluid from $m$ passes through the ducts $y$ and $w$ of the valve-rod, through the aperture $r^2$ of the sliding collar $r'$, and so on into the outlet-pipe $a$, and thence through $a'$ into the barrel or other receptacle into which the fluid is to be drawn, and so on until the measuring-chamber $m$ shall have become emptied, or measurably emptied—i. e., a given quantity, not necessarily the full volume of said chamber, will be discharged therefrom, and then the operation is repeated, as before.

The descriptions "up" and "down" as herein used are only to be understood as relative terms, as the instrument will work equally well in any other than a vertical position.

In Figs. 2 and 3 are shown an application of this device to the purpose of supplying carbonic acid to a beer-barrel, $l$. In this application the discharge-pipe $a'$ leads right into the open tap. To prevent shocks when leading the measured quantity of carbonic acid into the vessel a small air-chamber, $d$, with attached safety-valve and pressing-gage $t$, and having the inlet end of pipes leading to the pressing-gage located within the said chamber $d$ and protected by a cap-piece, $q$, as shown in Fig. 2, are used.

Having thus described my invention, what I claim as new, and desire to secure by Letters Patent, is—

1. A measuring device for fluids under pressure, having both its inlet and outlet valves closing in the direction of the pressure of the fluid, and the outlet-duct from the outlet-valve formed by a tube or duct in the operating-valve stem, substantially as described.

2. A measuring device for fluids under pressure, having spring-actuated inlet and outlet valves arranged to be opened and closed in the same direction to each other, and actuated or opened by a single tubular valve-rod which forms the eduction-duct from the outlet-valve, substantially as described.

3. A measuring device for fluids under pressure, having spring-actuated inlet and outlet valves, arranged to be opened and closed in the same direction to each other and in the same direction of the pressure of the fluid, in combination with a tubular valve-rod attached to the outlet-valve, and through which it discharges, substantially as described.

4. A measuring device for fluids, having its inlet and outlet valves assembled on a common operating-spindle made in the form of a tube through which the outlet-valve discharges, substantially as described.

5. A measuring device for fluids, provided with spring-actuated inlet and outlet valves assembled on a common operating tubular spindle through which they discharge, the whole being arranged so that the said tubular spindle shall operate the said valves at different times, closing the outlet-valve before opening the inlet-valve, substantially as described.

6. A measuring device for fluids, provided with spring-actuated inlet and outlet valves assembled on a common operating tubular spindle, which also acts as an outlet-pipe from the outlet-valve, the whole being arranged so that the said spindle shall operate the said valves at different times, closing the inlet-valve before opening the outlet-valve, substantially as shown and described.

7. A measuring device for fluids, having its inlet and outlet valves assembled on a common operating-spindle, the lower end of the said spindle forming the seat for the outlet-valve, substantially as and for the purpose set forth.

8. A measuring device for fluids, having its inlet and outlet valves assembled on a common operating-spindle, said spindle being apertured for the passage of the fluids, and its lower end forming the seat for the outlet-valve, substantially as shown and described.

9. A measuring device for fluids, consisting of a measuring-chamber provided with suitable inlet and outlet ways, an inlet and an outlet valve assembled on a common tubular operating-spindle which forms the discharge-pipe from the outlet-valve, and a stuffing-box for said spindle, substantially as described.

10. A measuring device for fluids, consisting of a measuring-chamber which is provided with suitable inlet and outlet ways controlled by inlet and outlet valves which are assembled on a common operating-spindle, said spindle being apertured for the passage of the fluids, substantially as described.

11. A measuring device for fluids, consisting of a measuring-chamber provided with suitable inlet and outlet ways, and with inlet and outlet valves, said valves being assembled on a common operating-spindle which is apertured for the passage of the fluids, and which is adapted to conduct the said fluids after they shall have been measured to and discharge them into the eduction-pipe, substantially as shown and described.

12. In a measuring device for fluids, a hollow operating-spindle attached to both the inlet and outlet valves so as to move them as required, and apertured for the passage of the fluids, and arranged to discharge into the eduction-pipe of the measuring device, said spindle being surrounded by a suitable stuffing-box and packed above and below its discharge-outlet to prevent leakage, substantially as shown and described.

13. In a measuring device for fluids, a hollow operating-spindle attached to and operating both the inlet and the outlet valves and apertured for the passage of the fluids, and surrounded by a suitable stuffing-box, and packed above and below its discharge-outlet, said packings being retained in place and away from the discharge-outlet of the spindle by a packing ring or sleeve, substantially as described and set forth.

14. In a measuring device for fluids, the combination of an operating-spindle apertured for the passage of the fluids and attached to the inlet and outlet valves of the apparatus, a stuffing-box for said spindle, the packing in which is placed above and below the discharge-outlet of the spindle, and a packing ring or sleeve which surrounds the spindle and separates the packing above and below said discharge outlet, said ring or sleeve having openings for the passage of the fluids, substantially as described.

15. In a measuring device for fluids, the combination of the operating-spindle, as $p$, attached to both the inlet and the outlet valves, apertured, as at $y\ w$, packings, as $x\ x'$, and a ring or sleeve, as $r'$, the whole being so arranged that the fluids as measured shall be conveyed through said spindle, which discharges into the said ring or sleeve, which in turn discharges into the eduction-pipe of the device, substantially as and for the purpose set forth.

16. Within the shell of a measuring device, the combination of a measuring-chamber, inlet and outlet valves and their operating-springs, an operating valve rod or spindle apertured for the passage of the fluid, and a stuffing-box for the said rod or spindle, substantially as described and set forth.

17. In a measuring and dividing apparatus for measuring and discharging small quantities of a fluid under pressure, a measuring-chamber fitted with inlet and outlet valves and attached to a common operating-spindle, through an axial opening in which the measured fluid is discharged, and with the said valves attached to the said rod so as to open and close in the same direction, as described and set forth.

18. The inlet and outlet valves attached to a common operating-rod, which is chambered to form the outlet from the outlet-valve, and loosely connected therewith, and provided with actuating-springs which act in concert with the pressure of the fluid to be measured, and at the same time as the movement of the operating-rod occurs, so as to move the said valves and in different times, the one opening or closing before the opening or closing of the other, and vice versa, substantially as described.

19. The valves $v$ and $v'$, arranged in combination with the measuring-chamber $m$ and the actuating-springs $f$ and $f'$, so that the combined action of the said springs and the pressure of the fluid to be measured act together to move the said valves, as described.

In witness whereof I have hereunto set my hand in presence of two witnesses.

HERMANN HAMMERSCHMIDT.

Witnesses:
RICHARD PHAIL,
GEO. KOCH.